(12) United States Patent
Folkersen et al.

(10) Patent No.: US 10,562,197 B2
(45) Date of Patent: Feb. 18, 2020

(54) SHINGLE CUTTING KNIFE BLADE

(71) Applicant: Roofers' Advantage Products, LLC, E. Wakefield, NH (US)

(72) Inventors: Jonny E Folkersen, E. Wakefield, NH (US); Benjamin J Folkersen, New Port Richey, FL (US)

(73) Assignee: Roofers Advantage Products, LLC, E. Wakefield, NH (US)

( * ) Notice: Subject to any disclaimer, the term of this patent is extended or adjusted under 35 U.S.C. 154(b) by 0 days.

(21) Appl. No.: 15/992,338

(22) Filed: May 30, 2018

(65) Prior Publication Data

US 2018/0345508 A1    Dec. 6, 2018

Related U.S. Application Data

(60) Provisional application No. 62/514,485, filed on Jun. 2, 2017.

(51) Int. Cl.
*B26B 9/02* (2006.01)
*B26D 1/00* (2006.01)
*B23D 49/11* (2006.01)
*E04D 15/02* (2006.01)

(52) U.S. Cl.
CPC .............. *B26B 9/02* (2013.01); *B23D 49/11* (2013.01); *B26D 1/0006* (2013.01); *E04D 15/02* (2013.01); *B26D 2001/006* (2013.01)

(58) Field of Classification Search
CPC .. B26B 9/02; B26D 1/0006; B26D 2001/006; E04D 15/02; B23D 49/11

USPC .................. 30/346.56, 353, 354; D8/20
See application file for complete search history.

(56) References Cited

U.S. PATENT DOCUMENTS

| | | | | |
|---|---|---|---|---|
| 5,720,105 | A | * | 2/1998 | Gates ................. B26B 5/001 30/162 |
| D493,340 | S | * | 7/2004 | Pyatt ................. D8/20 |
| 6,895,674 | B2 | * | 5/2005 | Ai ................. B26B 9/00 30/162 |
| D605,005 | S | * | 12/2009 | Benson ................. D8/20 |
| 8,099,871 | B2 | * | 1/2012 | Bilenski ................. B26B 5/005 30/162 |
| 2010/0293796 | A1 | * | 11/2010 | Votolato ................. B26B 29/00 30/287 |
| 2011/0094112 | A1 | * | 4/2011 | Patterson ................. B26B 9/02 30/355 |
| 2018/0194019 | A1 | * | 7/2018 | Knox ................. B26B 7/00 |
| 2018/0345508 | A1 | * | 12/2018 | Folkersen ................. B26B 9/02 |

* cited by examiner

*Primary Examiner* — Hwei-Siu C Payer
(74) *Attorney, Agent, or Firm* — Maine Cernota & Rardin

(57) ABSTRACT

A novel cutting device useful for cutting asphalt shingles and other roofing products features a blade having a top edge, a bottom edge located on an opposite side of the blade relative to the top edge, and left and right edges; a lower cutting edge adjacent the left or right edge; an upper sharpened edge positioned above the lower cutting edge and adjacent the same edge as the lower cutting edge, wherein the upper sharpened edge and the lower cutting edge are configured for cutting; at least one inner edge emanating from the bottom edge and angled towards the top edge, wherein the inner edge is tangent to the upper sharpened edge; and at least on nodule disposed between the lower cutting edge and the upper sharpened edge, wherein the bottom edge is parallel to and shorter than the top edge.

20 Claims, 4 Drawing Sheets

SHINGLE CUTTING KNIFE BLADE

RELATED APPLICATIONS

This application claims the benefit of U.S. Provisional Application No. 62/514,485, filed Jun. 2, 2017. This application is herein incorporated by reference, in its entirety, for all purposes.

FIELD OF THE DISCLOSURE

The disclosure relates to cutting devices, and more particularly, to a cutting device for cutting shingles and other construction materials.

BACKGROUND OF THE DISCLOSURE

Typical asphalt shingles have granules embedded in an outward-facing side of the product. Among other benefits, the upper surface of shingles is granular to provide UV resistance, ensuring a long service life. The non-granular underside of most asphalt shingles, including field and starter shingles, consists essentially of an adhesive mass, which is typically embedded into a scrim or mat.

Asphalt shingles are often cut using a straight utility knife blade by scoring the non-granule side of the shingle. Another method of cutting asphalt shingles on the non-granule side is using a hook blade installed into a utility knife. This permits the roofer to cut the shingles at a single point of contact on the knife blade, with the roofer facing the granular shingle side. Hook blades are commonly used along rake edges when a shingle needs to be cut to length, such as when the shingle extends past a drip edge and into transitions, such as in a valley area.

The act of cutting shingles on the non-granular side, although preferred and often easier, is not always possible, sometimes due to job site requirements, or preferred. For example, many roofers cut their books of starter shingles with the granule side facing the roofer.

Furthermore, field shingles, to prevent seams of subsequent courses from lining up, which may cause leaks, are typically cut, starting from a corner of a roof, in a shape resembling a ladder. The ladder effect of field shingles coming off the rake requires approximately 90% of the field shingles be cut to length at the rake location. Because of this, the roofer is often forced to look at the exposed granular side of the shingle determine where to cut the shingle. Also, the prevalence of laminate, i.e. dimensional, shingles also can force the roofer to look at the exposed granular side of the shingle to determine where the shingle is not laminated, i.e. of single thickness, as standard hook blades struggle with cutting these shingles at the laminate, especially in colder weather. In such situations, it is typical for the roofer to cut the shingle on the granule-containing side.

The typical roofing hook blade, as shown in FIG. 1, fits into a utility knife and is approximately 0.025" thick 201, 2¼" long 202, and ¾" wide 203. Hook blades also typically comprise a means of engaging 204 a handle, to both allow the blade to be retained by and prevent the blade from disengaging from the handle during use. The base 205 leads to a flat angle 206 of approximately 45 degrees. The flat angle 206 continues for approximately ⅜" and becomes a sharpened edge 207, which continues to the point 208. The point 208 is typically in line with the base 205, as depicted by the imaginary line 209. The sharpened edge 207 is typically a semi-circle or continuous arch 210.

Where a roofer uses a typical hook blade, the flat angle 206 forces the roofer to hold the knife upright, reducing the force that can be easily applied to the roofing product, as the roofer must apply force to the knife to maintain this upright position while pulling on the knife in the direction of the cut tends to pull the knife away from this upright position. For at least this reason, the closer the utility knife is to the flat plane of the product being cut, the easier it is to pull the knife through the material. Also, when drawing the knife to apply maximum force, an upright position effectively shortens the hook on the blade, making it difficult to cut through laminate shingles in an ergonomic manner.

Additionally, a typical hook blade results in only a single point of contact 211 between the blade and the shingle, due to the limited way the knife must be drawn. This causes the blade to wear out quickly at the single point of contact 211, requiring frequent blade replacement, despite the majority of the blade retaining a sharp edge.

Furthermore, typical hook blades, due to their narrow point 208, are prone to breakage as the roofer applies lateral pressure when rotating the blade or cutting a shingle along an object, such as a drip edge.

Lastly, typical hook blades are problematic because there is no way to control how deep the blade cuts. Many products in the roofing industry come in roll form, including tar paper, synthetic underlayment, and self-adhered products and cover materials, such as, TPO, EPDM, and modified bitumen. The point 208 on a standard hook blade is prone to cutting the underlying rolled product, as there is no way to regulate the blade's depth with the product needing to be unrolled prior to cutting.

Therefore, what is needed is a blade configured to cut a roofing shingle from the underside, using more than one point of contact on the blade, and that can withstand lateral forces encountered during roofing-related cutting without breakage that also incorporates a means of limiting the depth of cut.

SUMMARY OF THE DISCLOSURE

One embodiment of the present disclosure provides a blade, the blade comprising: a first edge, a second edge, a third edge located on an opposite side of the blade relative to the second edge, and a fourth edge located on an opposite side of the blade relative to the first edge, wherein the fourth edge is substantially shorter than the first edge and is positioned such that its edges are substantially equidistant from the edges of the first edge; a substantially circular edge having a proximal portion adjacent the second edge and a distal portion approximately opposite the proximal portion, wherein the circular edge is a sharpened edge configured for cutting; at least one inner edge emanating from the nearest edge of the fourth edge and angled towards the first edge, wherein the inner edge is tangent to the distal portion of the circular edge; and at least one nodule disposed on the circular edge.

Another embodiment of the present disclosure provides such a blade further comprising a valley configured to capture an asphalt shingle positioned at the interface where the circular edge and nodule meet nearest the distal portion of the circular edge.

A further embodiment of the present disclosure provides such a wherein the blade is configured to be retained in a knife.

Yet another embodiment of the present disclosure provides such a blade wherein the knife is a utility knife.

A yet further embodiment of the present disclosure provides such a blade wherein the nodule is positioned substantially centrally on the circular edge.

Still another embodiment of the present disclosure provides such a blade wherein the nodule is positioned adjacent the proximal portion of the circular edge.

A still further embodiment of the present disclosure provides such a blade wherein the nodule comprises a flat portion configured to cut that is coplanar with the fourth edge.

Even another embodiment of the present disclosure provides such a blade wherein the proximal portion of the substantially circular edge terminates in a point.

An even further embodiment of the present disclosure provides such a blade wherein the blade comprises two a substantially circular edges, two inner edges and two nodules, the second of each being a mirror image of the first.

One embodiment of the present disclosure provides a knife, the knife comprising: a blade, the blade comprising: a first edge, a second edge, a third edge located on an opposite side of the blade relative to the second edge, and a fourth edge located on an opposite side of the blade relative to the first edge, wherein the fourth edge is substantially shorter than the first edge and is positioned such that its edges are substantially equidistant from the edges of the first edge; a substantially circular edge having a proximal portion adjacent the second edge and a distal portion approximately opposite the proximal portion, wherein the circular edge is a sharpened edge configured for cutting; at least one inner edge emanating from the nearest edge of the fourth edge and angled towards the first edge, wherein the inner edge is tangent to the distal portion of the circular edge; and at least one nodule disposed on the circular edge.

Another embodiment of the present disclosure provides such a knife further comprising a valley configured to capture an asphalt shingle positioned at the interface where the circular edge and nodule meet nearest the distal portion of the circular edge.

A further embodiment of the present disclosure provides such a knife wherein the blade is configured to be adjustably retained in the knife.

Yet another embodiment of the present disclosure provides such a knife wherein the knife is a utility knife.

A yet further embodiment of the present disclosure provides such a knife wherein the nodule is positioned substantially centrally on the circular edge.

Still another embodiment of the present disclosure provides such a knife wherein the nodule is positioned adjacent the proximal portion of the circular edge.

A still further embodiment of the present disclosure provides such a knife wherein the nodule comprises a flat portion configured to cut that is coplanar with the fourth edge.

Even another embodiment of the present disclosure provides such a knife wherein the proximal portion of the substantially circular edge terminates in a point.

An even further embodiment of the present disclosure provides such a knife wherein the blade comprises two a substantially circular edges, two inner edges and two nodules, the second of each being a mirror image of the first.

A still even another embodiment of the present disclosure provides such a knife wherein the blade is removable.

A still even further embodiment of the present disclosure provides such a knife wherein the first edge of the blade comprises two u-shaped apertures configured to allow the blade to be retained by a standard utility knife, each aperture being equidistant from a closest, opposite edge adjacent the first edge.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

As a preliminary matter, a nodule 306, as used herein, is a bump having a sharpened edge. In embodiments described herein, the nodule 306 protrudes from the sharpened edge of a hook blade and is configured to capture a relatively thin material between the sharpened edge thereof and the sharpened edge of the hook blade, allowing simultaneous cutting of both a top and bottom face thereof while limiting the depth of a given cut.

A nodule and various embodiments of the same, decreases the draw force required when cutting a roofing shingle. Further curvature may be added to the nodule, further exposing a shingle's underside to a sharp cutting edge. A curl in embodiments of the blade also assists in cutting, by causing a shingle to roll itself around the curl (more so during temperature increases), driving the underside of the shingle into the additional cutting face created by the curvature in the blade. The underside of the shingle, as it rotates around the nodule and curvature, becomes the top side of the shingle. As such, the top of the shingle rolls, and the underside becomes further exposed to the cutting surface of the blade.

Additionally, the angle at which the utility knife can be drawn, in embodiments, is adjusted by removing material from the flat angle 206 to more closely reflect the flat plane of the shingle or product being cut. Currently, a roofer must hold the knife upright due to the angle at which the flat angle 206 is manufactured. The modification of the flat angle increases the draw strength being applied directly to the shingle or product being cut.

Figure 1:
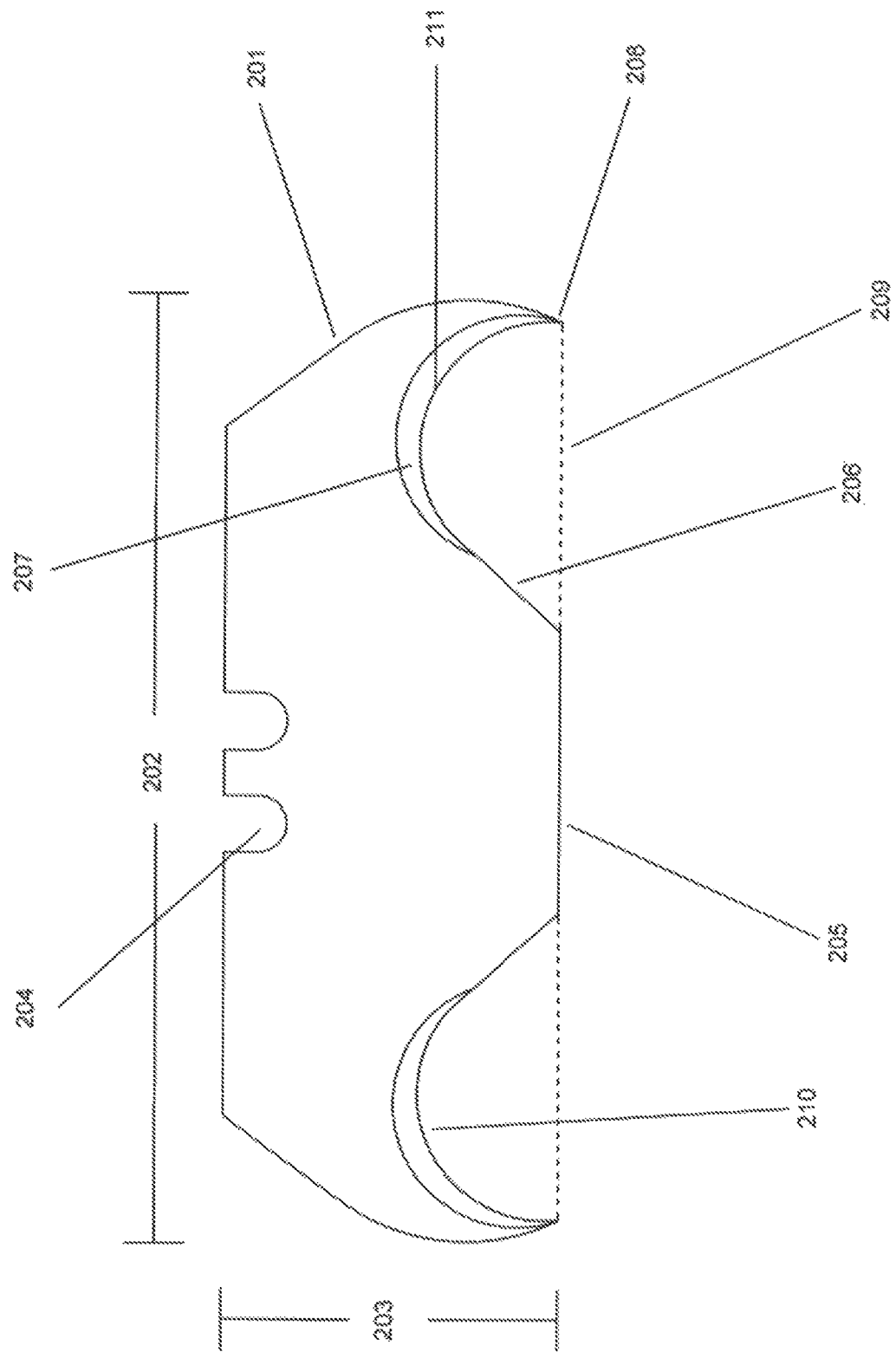
FIG. 1 is a line drawing illustrating a prior art hook blade.
Figure 2:
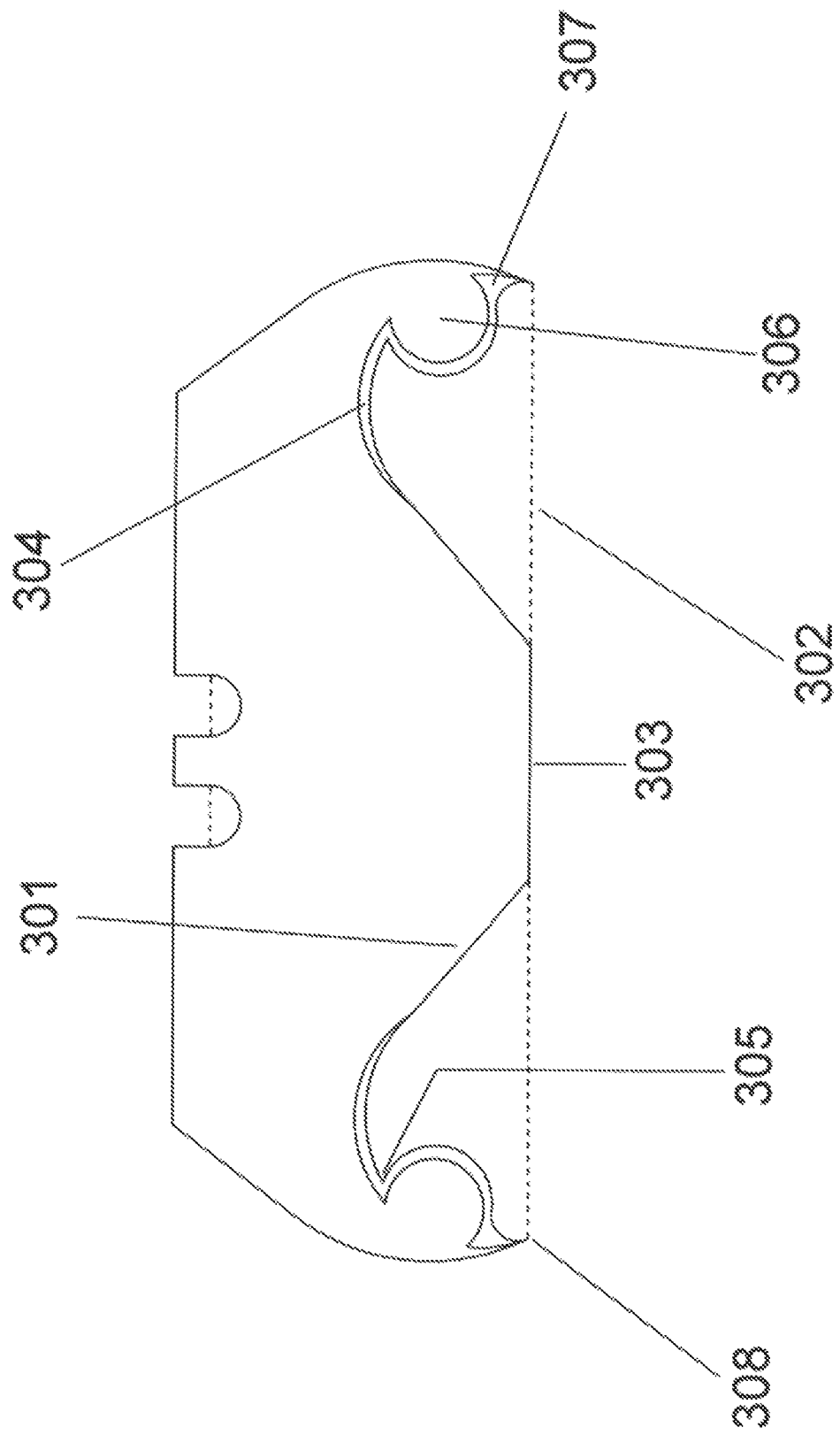
FIG. 2 is a line drawing illustrating a hook blade with the addition of a nodule, which terminates in a point, in accordance with embodiments of the present disclosure.

The cutting of rolled products in a depth controlled manner is made possible by the point 308 and its physical position relative to the nodule 306, as depicted in FIG. 2. These products for sloped roofing typically come in widths of 36" to 60". When commencing a cut on an underlayment while on the roof, it is often easier to start the cut in the field of the product due to maneuverability and reaching restrictions, hence the utility of a point 308. The same blade with the nodule 306 can be used to cut shingles without changing blades.

The increase in popularity of laminate or dimensional shingles with more than two laminates makes the design of a robust "roofing" version of the blade desirable. The manufacturing of a blade from a 1"-1½" wide material, as in various embodiments, allows the blade to accommodate a relatively thick shingles while providing for a larger nodule. In addition, a blade that is approximately ¼"-¾" wider strengthens the weakest part of the utility blade, making it less prone to breaking off while being subject to lateral pressure while maintaining the blades position.

Now referring to FIG. 2, FIG. 2 discloses a hook blade in accordance with embodiments of the present disclosure. From the base 303 of this hook blade, a straight line 301 extends diagonally, at an angle. This line 301 continues for a length and transitions to what is herein referred to as an upper sharpened edge 304, which in embodiments, comprises an arc with a radii incident on a midpoint thereof, if extended, that passes between an edge of base 303 and point 308, the upper sharpened edge 304 facing inwards, towards the base 303.

The upper sharpened edge 304 of embodiments further comprises a nodule 306. Due to the shape and placement of the nodule 306 on the hook blade, a valley 305 is created between the upper sharpened hook blade edge and the nodule. The valley 305 where the upper sharpened edge and the nodule intersect is herein referred to as the shear point 305.

More specifically, at the shear point 305 of embodiments, a nodule 306 extends outwards at an angle and continues, creating a bump. The nodule 306 of embodiments ends by connecting seamlessly with the lower cutting edge 307. The lower cutting edge 307 of embodiments continues in a slight crescent shape and terminates in a point 308. In embodiments, the point 308 terminates substantially on the imaginary line 302, which connects base 303 to points 308 of the hook blade.

Figure 3:
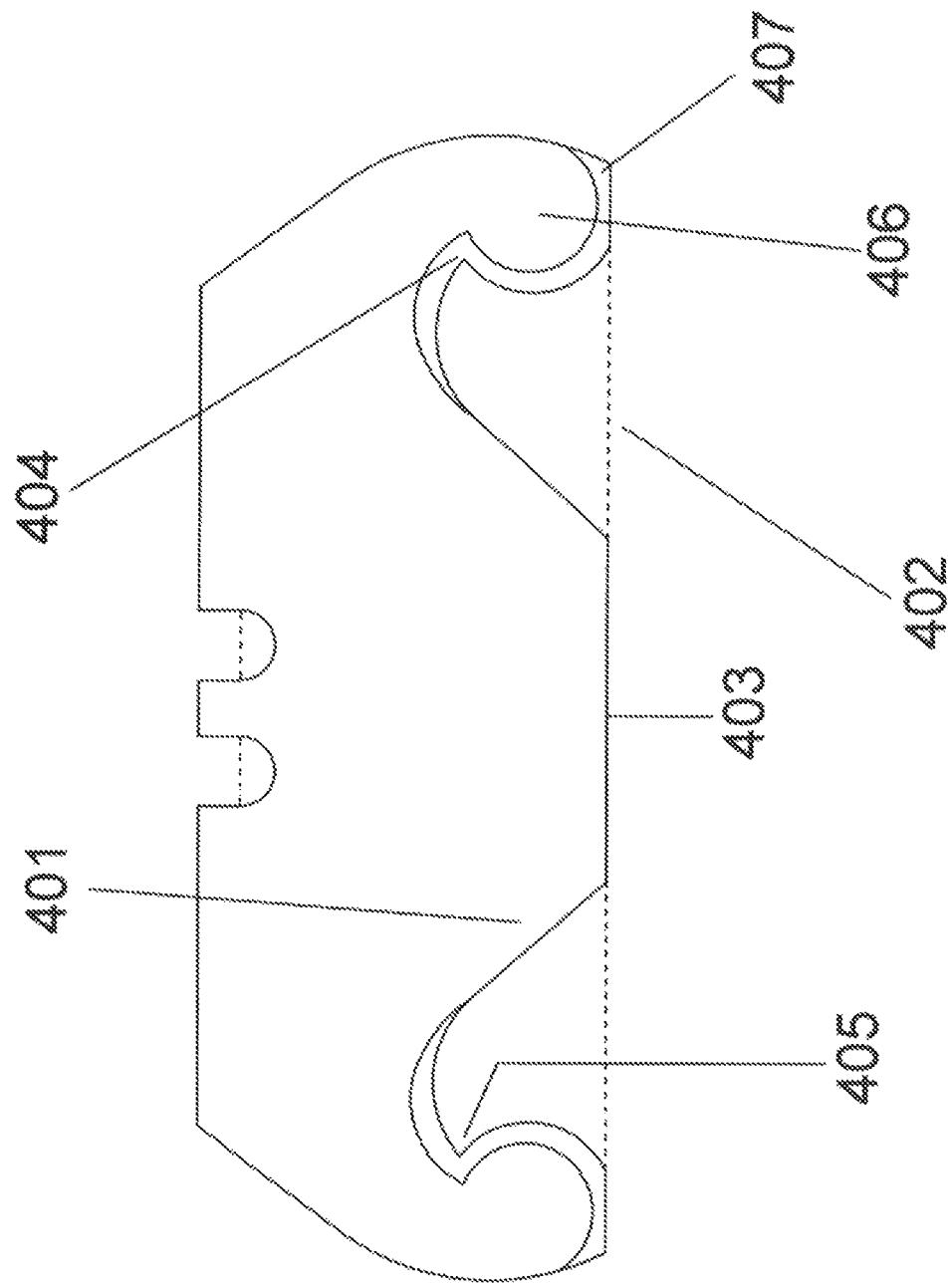
FIG. 3 is a line drawing illustrating hook blade with the addition of a nodule which becomes a lower cutting edge, in accordance with embodiments of the present disclosure.

Now referring to FIG. 3, FIG. 3 discloses a hook blade with a decreased flat angle 401, relative to the imaginary line 402, in accordance with embodiments of the present disclosure. The base 403 of such embodiments transitions into a flat angle 401. The flat angle 401 of embodiments continues for approximately ⅜" and becomes a sharpened edge 404, which smoothly transitions into a nodule 406, a sharpened outer portion of the nodule 406 protruding towards the imaginary line 402 and the flat angle 401, terminating in a flat lower cutting edge 407, with the surface of the lower cutting edge substantially coincident with the imaginary line 402.

Figure 4:
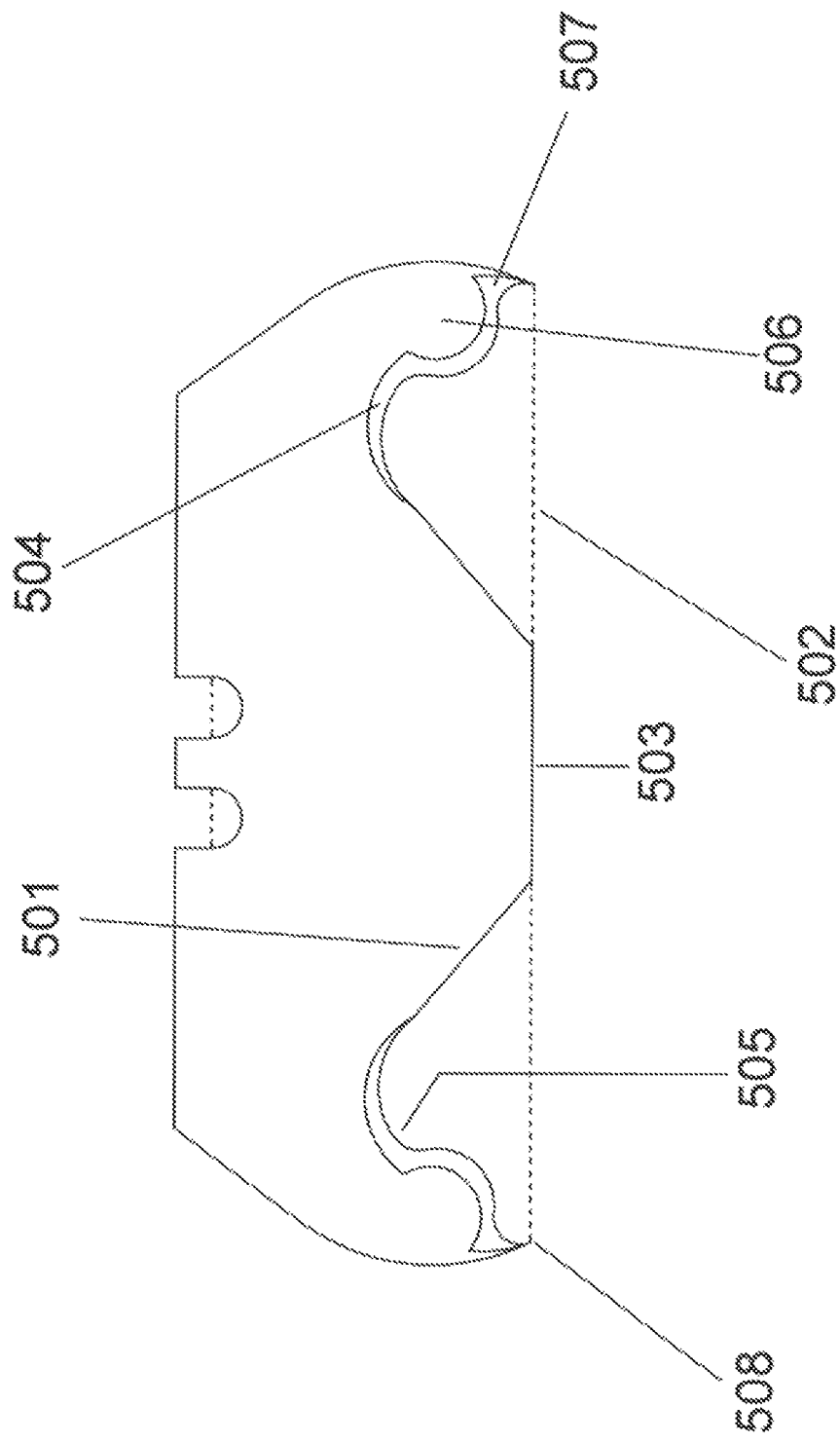
FIG. 4 is a line drawing illustrating hook blade with the addition of a nodule and curvature, which terminates in a point, in accordance with embodiments of the present disclosure.

Now referring to FIG. 4, FIG. 4 discloses a hook blade with a decreased flat angle 501, relative to the imaginary line 502, in accordance with embodiments of the present disclosure. As in previous embodiments, the base 503 of such embodiments transitions into a flat angle 501. The flat angle 501 continues for approximately ⅜" and becomes a sharpened edge 504, which transitions to an arc 505. At a point along the arc 505, the arc 505 transitions into a nodule 506 that extends towards the imaginary line 502 and the flat angle 501, before transitioning into a lower cutting edge 507 that is incident on the original arc 505. The lower cutting edge 507 of embodiments ends in a point 508. The point 508 and the base 503 terminate substantially on the imaginary line 502.

The foregoing description of the embodiments of the disclosure has been presented for the purposes of illustration and description. It is not intended to be exhaustive or to limit the disclosure to the precise form disclosed. Many modifications and variations are possible in light of this disclosure.

It is intended that the scope of the disclosure be limited not by this detailed description, but rather by the claims appended hereto.

What is claimed is:

1. A blade, the blade comprising:
   a top edge, a bottom edge located on an opposite side of the blade relative to the top edge, and left and right edges;
   a lower cutting edge adjacent said left or right edge;
   an upper sharpened edge positioned above said lower cutting edge and adjacent the same edge as said lower cutting edge;
   at least one inner edge emanating from said bottom edge and angled towards said top edge; and
   at least one nodule disposed between said lower cutting edge and said upper sharpened edge,
   wherein said inner edge is tangent to said upper sharpened edge,
   wherein said upper sharpened edge and lower cutting edge are configured for cutting, and said
   wherein said bottom edge is parallel to and shorter than said top edge.

2. The blade of claim 1 further comprising a valley configured to capture an asphalt shingle positioned at an interface where the upper sharpened edge and the nodule meet.

3. The blade of claim 1 wherein said blade is configured to be retained in a knife.

4. The blade of claim 1 wherein said lower cutting edge comprises a flat portion configured to cut and being coplanar with said bottom edge.

5. The blade of claim 1 wherein said lower cutting edge terminates in a point.

6. The blade of claim 1 wherein said blade further comprises an additional upper sharpened edge, an additional lower cutting edge, an additional inner edge, and an additional nodule.

7. The blade of claim 1 wherein said upper sharpened edge is arc-shaped.

8. The blade of claim 7 wherein said upper sharpened edge, said lower cutting edge, and said nodule form a continuous cutting edge.

9. A knife, the knife comprising:
   a blade, the blade comprising:
   a top edge, a bottom edge located on an opposite side of the blade relative to the top edge, and left and right edges;
   a lower cutting edge adjacent said left or right edge and an upper sharpened edge, wherein said upper sharpened edge and said lower cutting edge are configured for cutting;
   at least one inner edge emanating from said bottom edge and angled towards said top edge, wherein said inner edge is tangent to said upper sharpened edge; and
   at least one nodule disposed between said lower cutting edge and said upper sharpened edge,
   wherein said bottom edge is parallel to and shorter than said top edge, and
   wherein at least said upper sharpened edge is arc-shaped.

10. The knife of claim 9 further comprising a valley configured to capture an asphalt shingle positioned at an interface where the upper sharpened edge and the nodule meet.

11. The knife of claim 9 wherein said blade is configured to be adjustably retained in the knife.

12. The knife of claim 9 wherein said nodule lower cutting edge comprises a flat portion configured to cut and being coplanar with said bottom edge.

13. The knife of claim 9 wherein said lower cutting edge terminates in a point.

14. The knife of claim 9 wherein said blade further comprises an additional upper sharpened edge, an additional lower cutting edge, an additional inner edge, and an additional nodule.

15. The knife of claim 14 wherein said blade is removable.

16. The knife of claim 15 wherein said top edge of said blade comprises two, centrally disposed, u-shaped apertures configured to allow the blade to be retained.

17. The knife of claim 9 wherein said upper sharpened edge is arc-shaped.

18. The knife of claim 17 wherein said upper sharpened edge, said lower cutting edge, and said nodule form a continuous cutting edge.

19. A blade, the blade comprising:
- a lower cutting edge and an upper sharpened edge, wherein said upper sharpened edge and said lower cutting edge are configured for cutting; and
- at least one nodule disposed between said lower cutting edge and said upper sharpened edge,
- wherein at least said upper sharpened edge is arc-shaped, and
- wherein said upper sharpened edge, and lower cutting edge, and said nodule form a continuous cutting edge.

20. The blade of claim 19 wherein a bottom edge of said blade is parallel to and narrower than a top edge of said blade.

* * * * *